United States Patent
Lim et al.

(10) Patent No.: US 8,854,569 B2
(45) Date of Patent: Oct. 7, 2014

(54) DISPLAY APPARATUS, BONDING FILM USED FOR THE DISPLAY APPARATUS, AND METHOD OF MANUFACTURING THE BONDING FILM

(75) Inventors: Yong Woon Lim, Seoul (KR); Chun-Ho Song, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 338 days.

(21) Appl. No.: 13/085,172

(22) Filed: Apr. 12, 2011

(65) Prior Publication Data

US 2012/0120340 A1 May 17, 2012

(30) Foreign Application Priority Data

Nov. 11, 2010 (KR) .................. 10-2010-0112261

(51) Int. Cl.
*G02F 1/1333* (2006.01)
*B29C 65/00* (2006.01)
*B32B 7/08* (2006.01)
*B29C 41/02* (2006.01)

(52) U.S. Cl.
CPC ............. *G02F 1/133308* (2013.01); *G02F 2001/133314* (2013.01); *G02F 2001/13332* (2013.01); *B32B 2457/202* (2013.01); *B32B 7/08* (2013.01); *G02F 2201/46* (2013.01); *B29C 41/02* (2013.01)
USPC .............................. 349/58; 156/152

(58) Field of Classification Search
None
See application file for complete search history.

(56) References Cited

U.S. PATENT DOCUMENTS

| 7,018,496 | B1 * | 3/2006 | George et al. ............... 156/152 |
| 7,570,316 | B2 | 8/2009 | Kim |
| 7,764,004 | B2 | 7/2010 | Aizenberg et al. |
| 8,196,270 | B2 * | 6/2012 | Mandzsu et al. .............. 24/446 |
| 2007/0132907 | A1 * | 6/2007 | Kim .............................. 349/58 |
| 2008/0073323 | A1 | 3/2008 | Full et al. |

FOREIGN PATENT DOCUMENTS

KR 1020070113851 11/2007

* cited by examiner

*Primary Examiner* — Wen-Ying P Chen
(74) *Attorney, Agent, or Firm* — H.C. Park & Associates, PLC

(57) ABSTRACT

A display apparatus may include a display panel between top and bottom covers. The display panel has a display area to display an image. The display panel may be inserted in the bottom cover, which includes a bottom surface having a shape corresponding to a shape of the display panel. Lateral sides of the bottom cover extend upward from the bottom surface. The top cover supports edges of the display panel and includes a top surface having a display window to expose the display area. Lateral sides of the top cover extend toward the bottom cover from the top surface. A bonding film may be bonded to the top and bottom covers to fixedly couple the top cover to the bottom cover.

17 Claims, 9 Drawing Sheets

DISPLAY APPARATUS, BONDING FILM USED FOR THE DISPLAY APPARATUS, AND METHOD OF MANUFACTURING THE BONDING FILM

CROSS REFERENCE TO RELATED APPLICATION

This application claims priority from and the benefit of Korean Patent Application No. 10-2010-0112261, filed on Nov. 11, 2010, which is hereby incorporated by reference for all purposes as if fully set forth herein.

BACKGROUND OF THE INVENTION

1. Field of the Invention

Exemplary embodiments of the present invention relate to a display apparatus, a bonding film used for the display apparatus, and a method of manufacturing the bonding film. In particular, exemplary embodiments of the present invention relate to a display apparatus equipped with top and bottom covers being light weight and slim in structure, a bonding film is used for the display apparatus, and a method of manufacturing the bonding film.

2. Description of the Background

In general, a liquid crystal display (LCD) has advantages of low power consumption, and being light weight and slim compared to a cathode ray tube display apparatus or a plasma display panel. To maximize these advantages, various technologies have been continuously developed to reduce the thickness and weight of the liquid crystal display.

In some cases, a LCD with a top cover and a bottom cover may be used. The top cover and bottom cover, which may receive a display panel and a backlight assembly, respectively, can comprise a large weight ratio of the liquid crystal display. In this regard, a technology to manufacture the top cover and the bottom cover having slim structures and being light weight is needed. However, if the top cover and the bottom cover have slim structures, defects typically occur when the top cover is screw-coupled to the bottom cover. Accordingly, there is a need for manufacturing LCDs with slim and lightweight top and bottom covers without occurrence of such defects.

SUMMARY OF THE INVENTION

Exemplary embodiments of the present invention provide a display apparatus including a top cover and a bottom cover having a light weight and a slim structure.

Exemplary embodiments of the present invention also provide a bonding film to bond the top cover with the bottom cover.

Exemplary embodiments of the present invention also provide a method of manufacturing the bonding film to bond the top cover with the bottom cover.

Additional features of the exemplary embodiments will be set forth in the is description which follows, and in part will be apparent from the description, or may be learned by practice of the invention.

Exemplary embodiments of the invention disclose a display apparatus includes a display panel, a top cover, a bottom cover, and a bonding film. The display panel includes a display area to display an image. The bottom cover includes a bottom surface having a shape corresponding to a shape of the display panel and lateral sides extending upward from the bottom surface. The display panel is positioned within the bottom cover. The top cover includes a top surface having a display window to expose the display area and lateral sides extending toward the bottom cover from the top surface. The top cover supports edges of the display panel. The bonding film is bonded to the top cover and the bottom cover to fixedly couple the top cover to the bottom cover. The bonding film includes a base having a plate shape, a plurality of first protrusions protruding from a surface of the base to face the top cover and the bottom cover, a plurality of second protrusions protruding from surfaces of the first protrusions to face the top cover and the bottom cover, and a plurality of bonding parts disposed on the second protrusions. An area of a surface of each bonding part bonded to the top cover and the bottom cover is larger than a sectional area of each second protrusion parallel to the surface of each bonding part.

Exemplary embodiments of the present invention disclose a bonding film including a base, a plurality of first protrusions, a plurality of second protrusions, and a plurality of bonding parts. The base has a plate shape. The plurality of first protrusions protrudes from a surface of the base facing an object to be bonded. The plurality of second protrusions protrudes from surfaces of the first protrusions facing the object to be bonded. The plurality of bonding parts is provided on the second protrusions. An area of a surface of each bonding part bonded to the object is larger than a sectional area of each second protrusion parallel to the surface of each is bonding part.

Exemplary embodiments of the present invention disclose a method of manufacturing a bonding film. The method includes preparing a mold including a base film and a top film formed on the base film. A plurality of holes exposes at least one portion of the base film. A polymer is coated on the mold whereby the polymer fills the holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
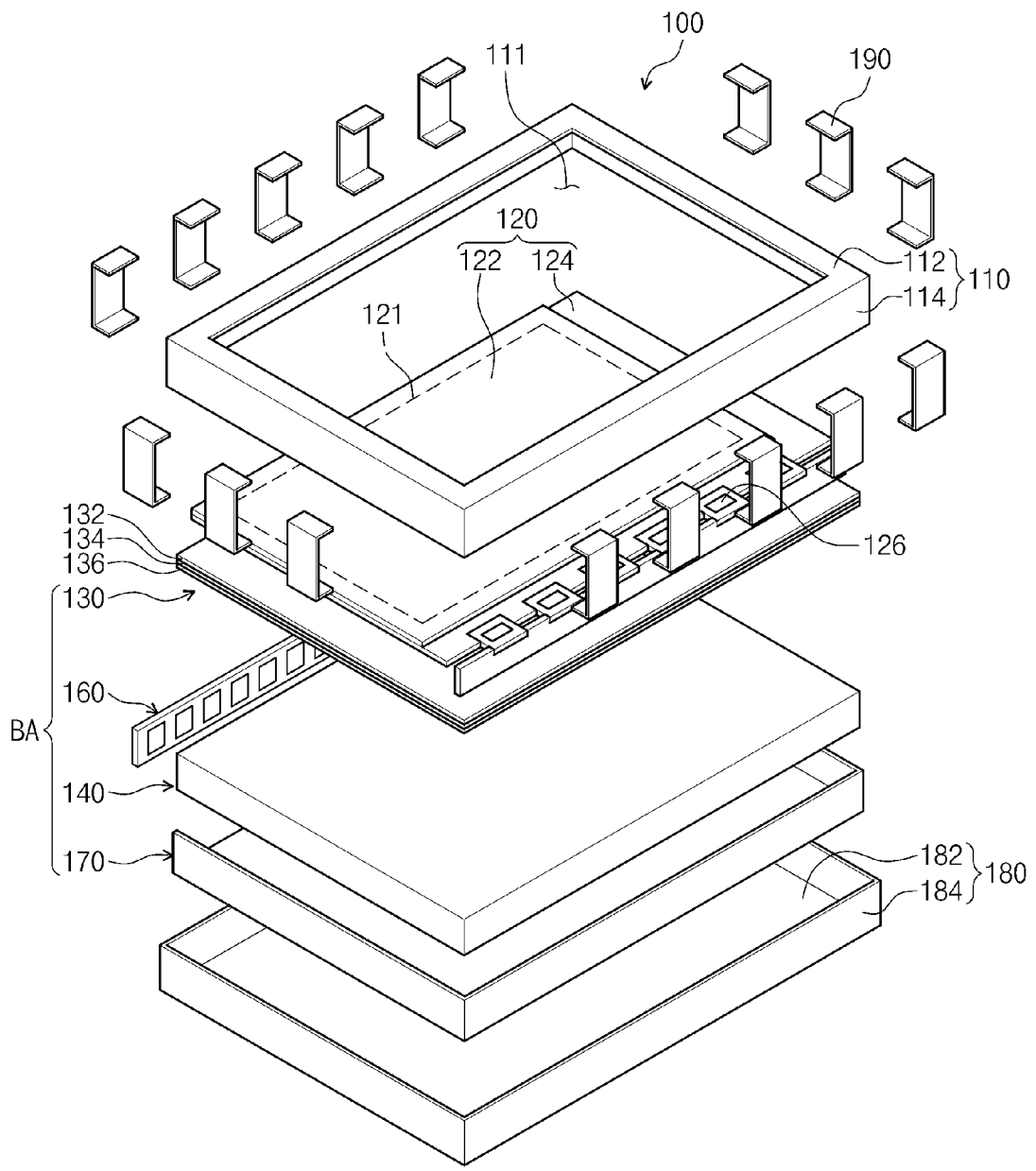
FIG. 1 is an exploded perspective view showing a display apparatus according to exemplary embodiments of the present invention.

The invention is described more fully hereinafter with reference to the accompanying drawings, in which exemplary embodiments of the invention are shown. This is invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in is use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
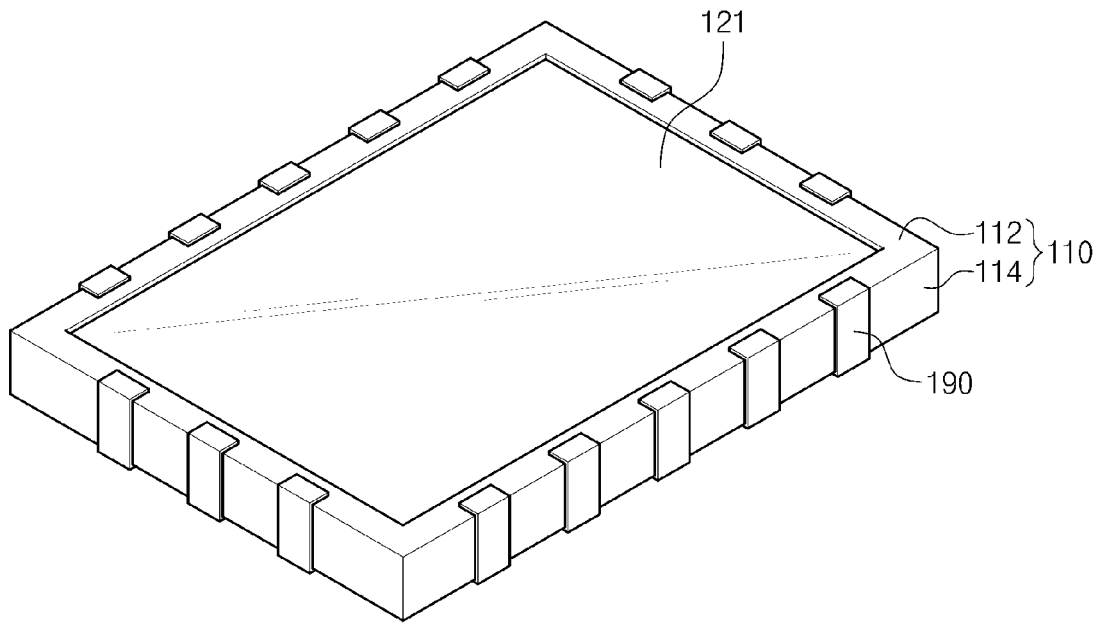
FIG. 2 is a perspective view showing an assembled state of the display apparatus of FIG. 1 according to exemplary embodiments of the present invention.
Figure 3:
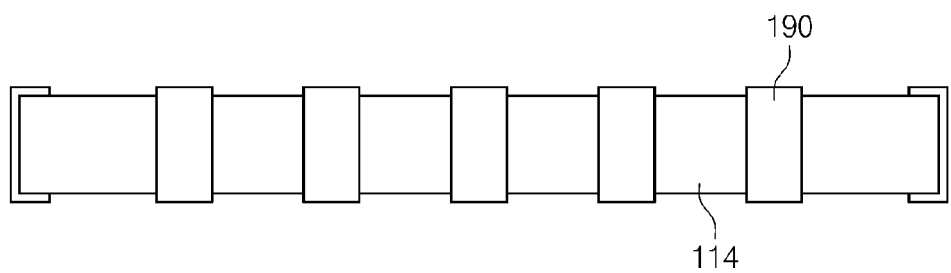
FIG. 3 is a front view showing the display apparatus of FIG. 2 according to exemplary embodiments of the present invention.
Figure 4:
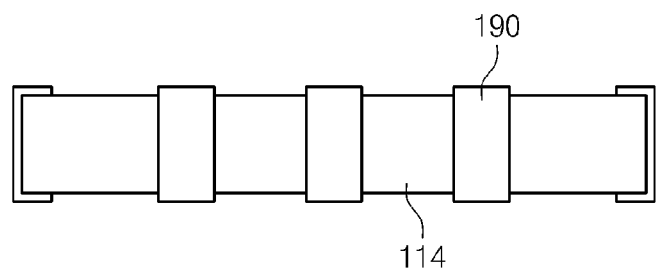
FIG. 4 is a side view showing the display apparatus of FIG. 2 according to exemplary embodiments of the present invention.

FIG. 1 is an exploded perspective view showing a display apparatus according to is exemplary embodiments of the present invention. FIG. 2 is a perspective view showing an assembled state of the display apparatus of FIG. 1. FIG. 3 is a front view showing the display apparatus of FIG. 2. FIG. 4 is a side view showing the display apparatus of FIG. 2.

Referring to FIG. 1, FIG. 2, FIG. 3, and FIG. 4, the display apparatus 100 may include a backlight assembly BA, a display panel 120, a bottom cover 180, a top cover 110, and a bonding film 190 to bond the bottom cover 180 to the top cover 110.

The display panel 120 has a display area 121 to display an image. The display panel 20 may include a liquid crystal display panel or an electrophoretic display panel. In some cases, the liquid crystal display panel may be used as the display panel 120.

The display panel 120 has a rectangular shape with long lateral sides and short lateral sides. In addition, the display panel 120 may include an array substrate 122, an opposite substrate 124 facing the array substrate 122, and a liquid crystal layer (not shown) interposed between the array substrate 122 and the opposite substrate 124. In general, the display panel 120 may have any suitable shape and size, and is not limited to a rectangular shape with short and/or long lateral sides. For instance, the display panel 120 may, in some cases, be a square.

The array substrate 122 may include a plurality of pixels (not shown) in the form of a matrix. Each pixel may include a gate line (not shown) extending in the first direction, which is parallel to one edge of the array substrate 122, a data line (not shown) extending in the second direction, which is perpendicular to the first direction and crossing the gate line while being insulated from the gate line, and a pixel electrode (not shown). Each pixel may include a thin film transistor (not shown) electrically connected to the gate line and the data line corresponding to the pixel electrode. For example, a gate of the thin film transistor may be connected to the gate line, and a source and/or drain may be connected to the data line of the thin is film transistor. The thin film transistor may switch the driving signal supplied to the corresponding pixel electrode. In addition, a driver IC 126 may be provided at one side of the array substrate 122. The driver IC 126 may receive various external signals and may output the driving signal to drive the display panel 120 in response to the various external signals.

The opposite substrate 124 may be provided on one surface thereof with an RGB color filter (not shown) to represent a predetermined color. A common electrode (not shown) may be formed on the RGB color filter in opposition to the pixel electrode. The RGB color filter may be formed through a thin film forming process. It should be understood that the color filter is not limited to being formed on the opposite substrate, that the color filter may be formed in any suitable location, and that various configurations of the color filter may be used. For instance, the color filter can be formed on the array substrate 122.

The liquid crystal layer may be aligned in a specific direction in response to an electric field generated by voltages applied to the pixel electrode and the common electrode. The liquid crystal layer may adjust transmittance of the light supplied from the backlight assembly BA to allow the display panel 120 to display an image.

The backlight assembly BA is provided under the display panel 120. The backlight assembly BA may include a light guide plate 140, a light source 160, an optical member 130, and a reflective sheet 170.

The light guide plate 140 may have a size and a shape corresponding to a size and a shape of the display panel 120. For instance, the light guide plate 140 may have a rectangular plate shape. In general, the light guide plate 140 may be any suitable shape and size that corresponds to the size and shape of the display panel 120.

The light source 160 may be provided on at least one side of the light guide plate 140. The light source 160 may supply light to the light guide plate 140 to allow the display panel 120 to display an image. The light provided by the light source 160 may be of any suitable wavelength or frequency. The light guide plate 140 may guide light from the light source 160 to the display panel 120.

The optical member 130 may be interposed between the light guide plate 140 and the display panel 120 and may control light generated from the light source 160. The optical member 130 may include a diffusion sheet 136, a prism sheet 134, and a protective sheet 132, which are sequentially stacked on the light guide plate 140.

The diffusion sheet 136 may diffuse light generated from the light source 160. The prism sheet 134 may focus the light diffused by the diffusion sheet 136 in a direction perpendicular to the plane of the display panel 120. Most of the light that passes through the prism sheet 134 may thus be perpendicularly incident to the display panel 120. The protective sheet 132 may be aligned on the prism sheet 134, and may protect the prism sheet 134 from external impact.

The optical member 130 may include a diffusion sheet 136, prism sheet 134, and protective sheet 132, but is not limited thereto. For example, in some cases, the optical member 130 may include a plurality of diffusion sheets 136, prism sheets 134, or protective sheets 132, or one of the diffusion sheet 136, the prism sheet 134, or the protective sheet 132 may be omitted. Accordingly, various configurations of the optical member 130 may be used to in the backlight assembly BA to provide and guide light to the display panel 120.

The reflective sheet 170 may be provided below the light source 160 to reflect any light leakage directed away from the display panel 120, toward the display panel 120. The reflective sheet 170 may be composed of any suitable material capable of reflecting the light. The reflective sheet 170 may be provided on the bottom cover 180 to reflect the light generated from the light source 160. As a result, the reflective sheet 170 may increase the amount of the light directed to the display panel 120.

The top cover 110 may be provided on a top side of the display panel 120 or on the side opposite of the bottom cover 180. The top cover 110 may have a shape corresponding to a shape of the display panel 120. In general, the top cover 110 may be any suitable shape and size that corresponds to the size and shape of the display panel 120. The top cover 110 may include a top surface 112 having a display window 111 that exposes the display area 121 of the display panel 120 and that supports an edge of the top surface of the display panel 120. The top cover 110 may also include lateral sides 114 extending toward the bottom cover 180 from the top surface 112. Since the display panel 120 may have a rectangular plate shape, the top cover 110 may correspondingly have four lateral sides 114. The top cover 110 may be coupled to the bottom cover 180 to support the edge of the top surface of the display panel 120.

The bottom cover 180 may be provided under the backlight assembly BA. The bottom cover 180 may include a bottom surface 182 having a shape corresponding to the shape of the display panel 120 and the backlight assembly BA, and lateral sides 184 extending upward from the bottom surface 182. Since the display panel 120 and the backlight assembly BA may have a rectangular plate shape, the bottom cover 180 may correspondingly have four lateral sides 184. In general, the bottom cover 180 may be any suitable shape and size that corresponds to the size and shape of the display panel 120. The bottom surface 182 and the lateral sides 184 of the bottom cover 180 may define a cavity to receive the display panel 120 and the backlight assembly BA. In addition, the bottom cover 180 may be coupled to the top cover 110 to receive and support the display panel 120 and the backlight assembly BA.

The bonding film 190 may be bonded to a part of the top cover 110 and the bottom cover 180, and may couple the top cover 110 to the bottom cover 180. In some cases, the bonding film 190 may be bonded to the top surface 112, the lateral sides 114 of the top cover 110, the bottom surface 182 of the bottom cover 180, and the lateral sides 184 of the bottom cover 180 to fixedly couple the top cover 110 to the bottom cover 180. The bonding film 190 may include at least one folding line corresponding to the edges of the top cover 110 and the bottom cover 180 to prevent the lifting of the edges of the top cover 110 and the bottom cover 180.

Hereinafter, the bonding film 190 used in the display apparatus 100 of FIG. 1 will be described in detail.

Figure 5:
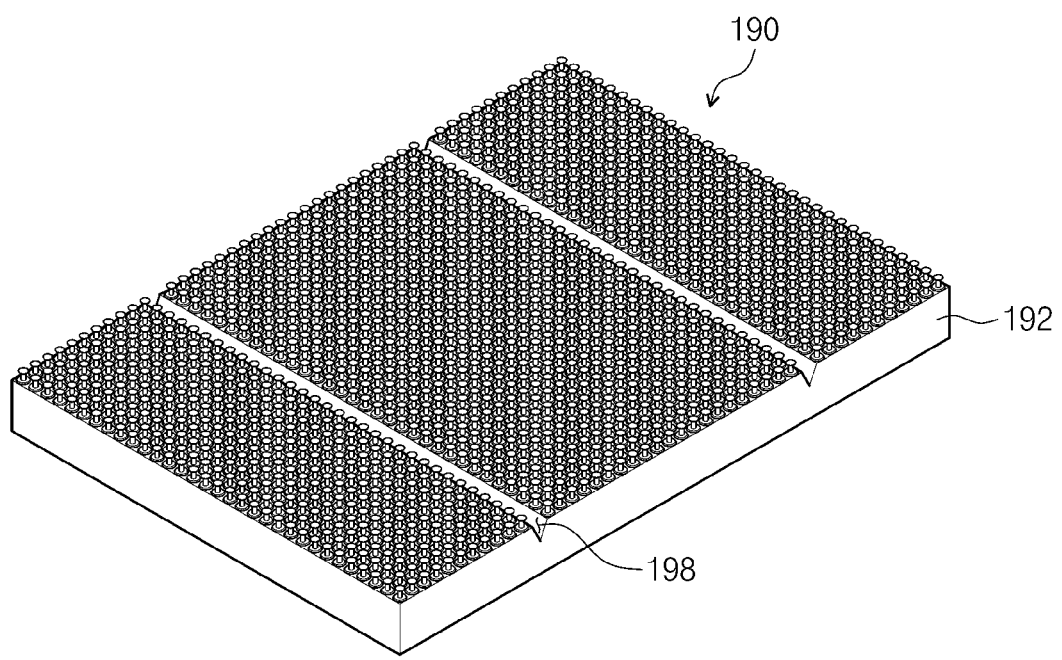
FIG. 5 is a perspective view showing the bonding film used in the display is apparatus of FIG. 1 according to exemplary embodiments of the present invention.
Figure 6:
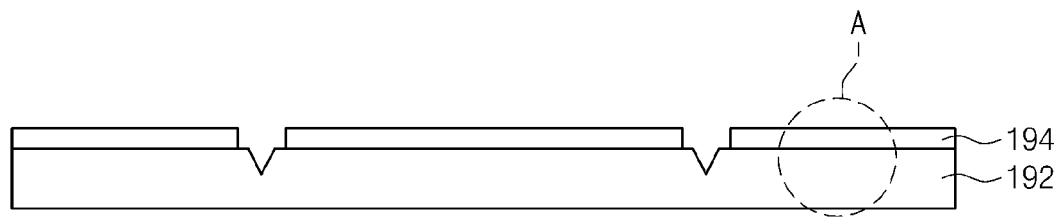
FIG. 6 is a sectional view showing the bonding film of FIG. 5 according to exemplary embodiments of the present invention.
Figure 7:
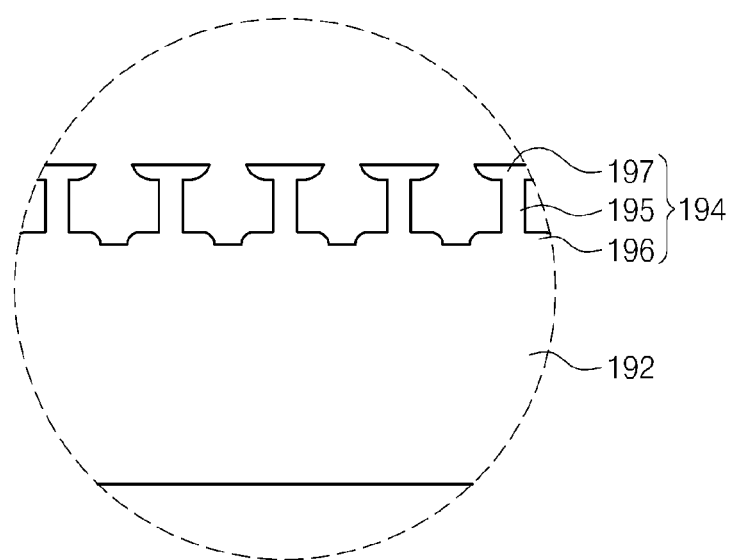
FIG. 7 is a partially enlarged view of the bonding film of FIG. 5 according to exemplary embodiments of the present invention.

FIG. 5 is a perspective view showing the bonding film used in the display apparatus of FIG. 1. FIG. 6 is a sectional view showing the bonding film used in the display apparatus of FIG. 5. FIG. 7 is a partially enlarged view of the bonding film used in the display apparatus of FIG. 5.

Referring to FIG. 5, FIG. 6, and FIG. 7, the bonding film 190 used in the display apparatus 100 may include a flexible material. In addition, the bonding film 190 may include a polymer, which may include at least one material selected from the group consisting of poly tetra fluoro ethylene (PTFE), polydimethylsiloxane (PDMS), polyethylene glycol (PEG), polyurethane, (beta) β-keratin, and any combination thereof.

The bonding film 190 may include a base 192 having a plate shape and a plurality of protrusions 194. Each of the protrusions 194 may include a first protrusion 196 protruding from the base 192, a second protrusion 195 protruding from the first protrusion 196, and a bonding part 197 provided on the second protrusion 195.

The base 192 may include at least one groove 198 extending from one end to the other end of the base 192. When the bonding film 190 is bonded to an object to be bonded, such as the top cover 110 and/or the bottom cover 180 shown in FIGS. 1 to 4, the groove 198 may serve as a folding line corresponding to an edge of the object to be bonded. If the bonding film 190 has no groove 198, the edge of the object to be bonded may be lifted.

The first protrusions 196 may protrude from the top surface of the base 192 facing the object to be bonded. The section of each first protrusion 196, which is parallel to the top surface of the base 192 facing the object to be bonded, may have a substantially circular shape, but is not limited thereto.

The second protrusions 195 may protrude from the first protrusions 196, which face the object to be bonded, in a pillar shape while supporting the bonding parts 197 formed on the second protrusions 195. The section of each second protrusion 195, which is parallel to the top surface of the base 192 facing the object to be bonded, may have a substantially circular shape. In addition, each second protrusion 195 may have a diameter of micro unit (e.g., $10^{-6}$ m) or less. It should be understood that the second protrusion 195 may be implemented using any suitable shape or configuration, and that the second protrusion is not limited to a circular-pillar shape as noted hereinabove.

The bonding parts 197 are bonded to the object to be bonded and provided on the second protrusions 195 in a one-to-one correspondence. A bonding area of each bonding part 197 may be larger than a sectional area of the second protrusion 195. Thus, the bonding area of the bonding film 190 may be enlarged due to the bonding parts 197. In addition, the bonding area of each bonding part 197 may be parallel to the surface of the base 192, which faces the object to be bonded.

The bonding force of the bonding parts 197 may depend, at least in part, on the van der Waals force applied to the surfaces of the bonding parts 197, which may be bonded to the object to be bonded. Therefore, even if the bonding force of each bonding part 197 may be weak, since the bonding film 190 is bonded to the object to be bonded through plural bonding parts 197, the bonding force of the bonding film 190 may be increased. Furthermore, since each bonding part 197 is bonded to the object to be bonded based on the van der Waals force, an additional adhesive is not necessary at the bonding surface of each bonding part 197.

The bonding film 190 may be easily removed from the object to be bonded. Since each bonding part 197 is bonded to the object to be bonded with a weak bonding force based on van der Waals forces, the bonding film 190 can be easily removed.

Therefore, the bonding film 190 can be easily bonded to or removed from the object to be bonded, so that the assembling and disassembling work for the display apparatus 100 may be easily performed.

In addition, the bonding film 190 does not require additional adhesive. The bonding force of the bonding film 190 may rarely vary after the bonding film 190 has been removed from an object to be bonded, so the bonding film 190 can be reused.

Figure 8:
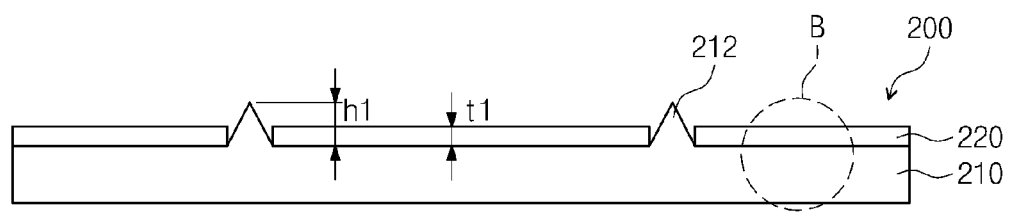
FIG. 8, FIG. 10, and FIG. 11 are sectional views illustrating a method of manufacturing a bonding film according to exemplary embodiments of the present invention.
Figure 9:
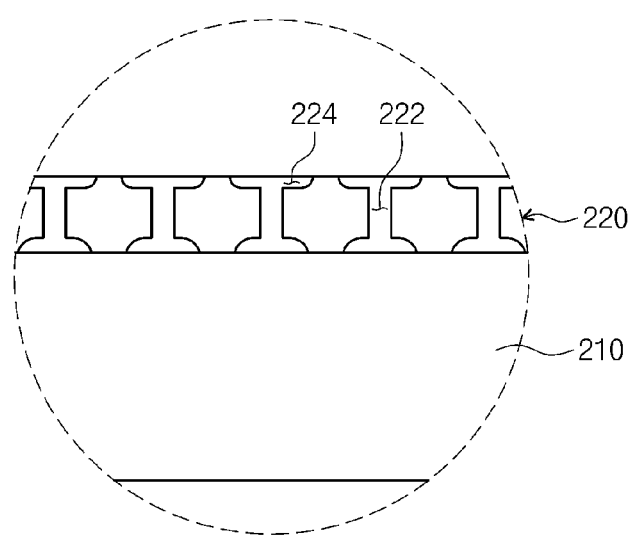
FIG. 9 is a partially enlarged view of "A" shown in FIG. 8 according to exemplary embodiments of the present invention.
Figure 10:
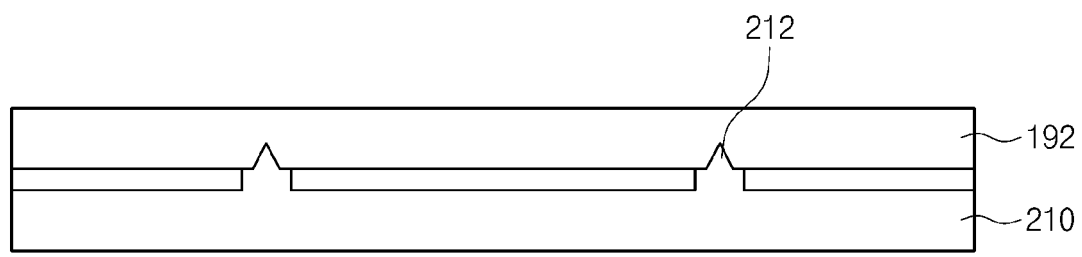
Figure 11:
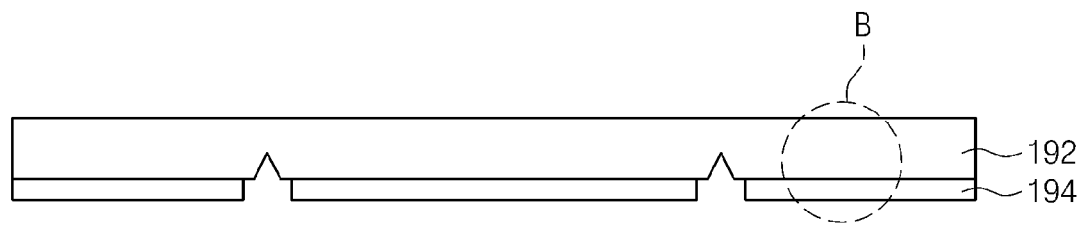
Figure 12:
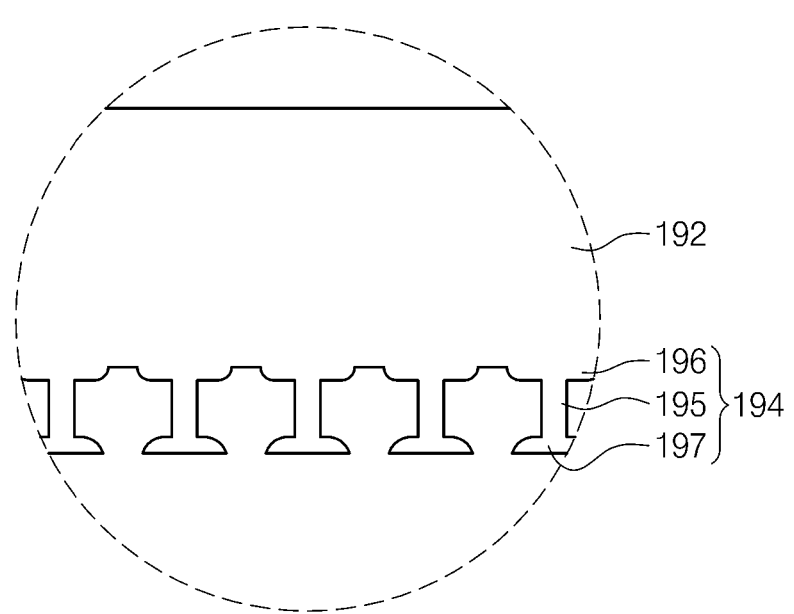
FIG. 12 is a partially enlarged view of "B" shown in FIG. 11 according to exemplary embodiments of the present invention.

FIG. 8, FIG. 10 and FIG. 11 are sectional views to describe a method of manufacturing the bonding film according to exemplary embodiments of the present invention. FIG. 9 is a partially enlarged view of "A" shown in FIG. 8. FIG. 12 is a partially enlarged view of "B" shown in FIG. 11.

Referring to FIG. 8 and FIG. 9, a mold 200 to manufacture the bonding film is prepared. The mold 200 may include a base film 210 and at least one top film 220 on the base film 210. The mold 200 and the base film 210 may comprise silicon.

The base film 210 may include at least one protrusion 212 having a triangular sectional shape. For instance, the protrusion 212 protrudes in the form of a triangular mountain toward and above the top films 220. A height of the protrusion 212 may be larger than a thickness t1 of the top film 220. Accordingly, the protrusion 212 may protrude higher than the top films 220. In addition, the protrusion 212 may extend from one end to the other end of the base film 210 to divide the base film 210 into a plurality of regions.

The top films 220 may be disposed in the regions of the base film 210 divided by the protrusions 212, and may include a plurality of holes 222 to expose a part of the base film 210. A lower end of each hole 222 may be a boundary surface between the base film 210 and the top film 220 and may be in the form of a cavity. An area of the base film 210 exposed through the cavity formed at the lower end of each hole 222 may be larger than a sectional area of each hole 222. In addition, a surface of the base film 210 exposed through each hole 222 may be parallel to or inclined to the boundary surface between the base film 210 and the top film 220.

Each top film 220 may include a plurality of recesses 224, which are formed opposite to the boundary surface between the base film 210 and the top film 220 corresponding to the holes 222. The recesses 224 may be formed in the top surface of the top film 220 opposite to the boundary surface between the base film 210 and the top film 220 while surrounding the holes 222.

Referring to FIG. 10, a polymer may be disposed on top film 220 and protrusions 212. The polymer may coat the mold 200 such that the polymer penetrates holes 222. The polymer may then be dried using any suitable drying method.

The polymer coating the mold 200 may be a flexible material having elasticity. The polymer may include at least one material selected from the group consisting of poly tetra fluoro ethylene (PTFE), polydimethylsiloxane (PDMS), polyethylene glycol (PEG), polyurethane, β-keratin and any combination thereof.

Thus, the polymer formed on the mold 200 may form the base 192 of the bonding film 190. In addition, the polymer filled in the holes 222 may form the second protrusions 195 of the bonding film 190, and the polymer filled in the cavity at the lower end of each hole 222, that is, at the boundary region between the base film 210 and the top film 220 may form the bonding parts 197 of the bonding film 190. In addition, the polymer filled in the recesses 224 may form the first protrusions 196 supporting the second protrusions 195.

Referring to FIGS. 11 and 12, after the polymer has been coated and dried on the mold 200, the mold 200 including base film 210 and protrusions 212 may be removed. Thus, the bonding film 190 having a shape corresponding to the shape of the mold 200 may be manufactured as shown in FIG. 5, FIG. 6, and FIG. 7. The bonding film 190 includes the base 192 having a plate shape, the first protrusions 196 protruding from the base 192, the second protrusions 195 protruding from the first protrusions 196, the bonding parts 197 provided on the second protrusions 195. In addition, grooves 198 are formed in the regions of the mold 200 corresponding to the protrusions 212.

If the mold 200 includes a material having weak bonding strength with respect to the polymer, and the polymer includes the flexible material having elasticity, a roll-to-roll method can be employed to manufacture the bonding film 190. If the roll-to-roll method is employed, the bonding film 190 can be manufactured in mass production, so that the manufacturing cost for the bonding film 190 can be reduced. The roll-to-roll method is a well-known method in the art that is often used to manufacture circuits and patterns on large substrates, therefore a detailed description of the roll-to-roll method is not provided herein.

Hereinafter, exemplary embodiments of the present invention will be described with reference to FIG. 13, FIG. 14, FIG. 15, and FIG. 16. In the following description, details of the elements and structures shown in FIG. 1, FIG. 2, FIG. 3, FIG. 4, FIG. 5, FIG. 6, FIG. 7, FIG. 8, FIG. 9, FIG. 10, FIG. 11, and FIG. 12 will be omitted to avoid redundancy, and the same reference numerals will be used to refer to the same elements.

Figure 13:
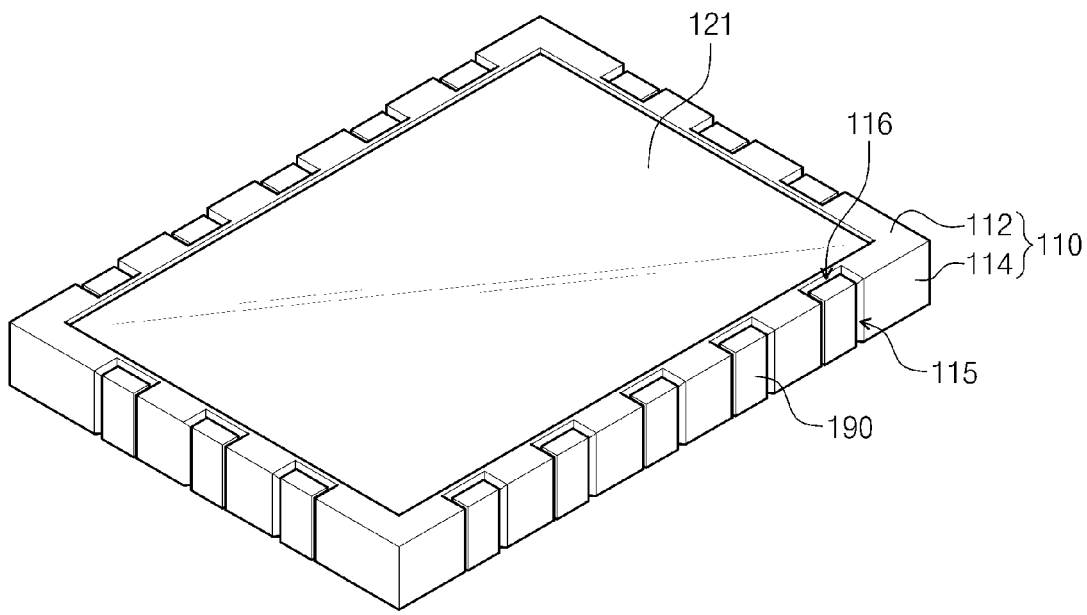
FIG. 13 is a top perspective view showing a display apparatus according to exemplary embodiments of the present invention.
Figure 14:
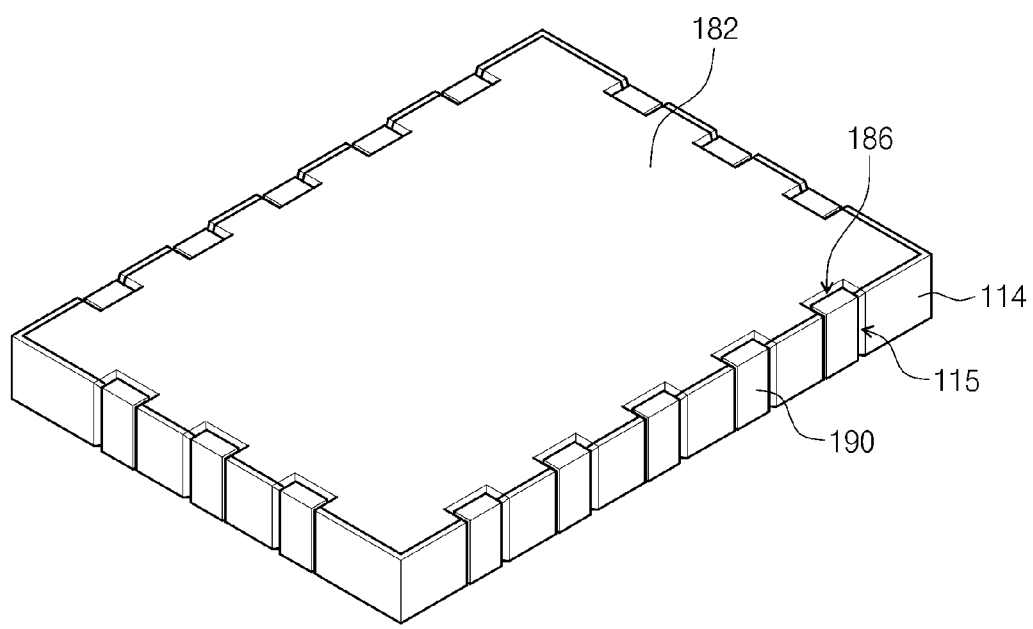
FIG. 14 is a bottom perspective view showing a display apparatus according to exemplary embodiments of the present invention.
Figure 15:
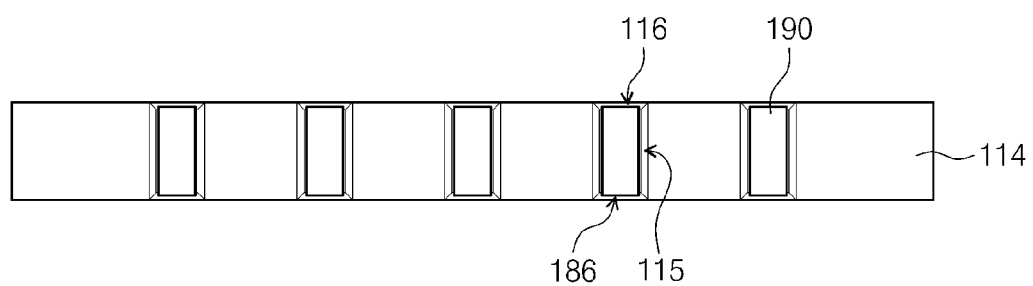
FIG. 15 is a front view showing a display apparatus according to exemplary embodiments of the present invention.
Figure 16:
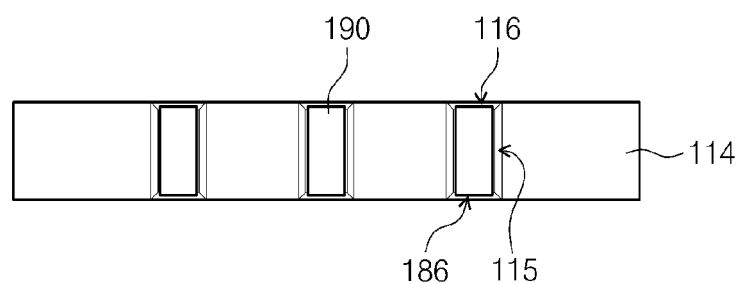
FIG. 16 is a side view showing a display apparatus according to exemplary embodiments of the present invention.

FIG. 13 is a top perspective view showing a display apparatus according to exemplary embodiments of the present invention. FIG. 14 is a bottom perspective view showing the display apparatus according to exemplary embodiments of the present invention. FIG. 15 is a front view showing the display apparatus according to exemplary embodiments of the present invention. FIG. 16 is a side view showing the display apparatus according to exemplary embodiments of the present invention.

Referring to FIG. 13, FIG. 14, FIG. 15, and FIG. 16, the top cover 110 may include a plurality of first bonding film attachment parts 115, which are recessed at certain regions of the lateral sides 114 and top surface 112 of the top cover 110 such that the bonding films 190 can be attached to the first bonding film attachment parts 115. In addition, the bottom cover 180 may include a plurality of second bonding film attachment parts 186, which are recessed at certain regions of the bottom surface 182 and lateral sides 184 of the bottom cover 180 corresponding to the first bonding film attachment parts 115 such that the bonding films 190 can be attached to the second bonding film attachment parts 186. The first and second bonding film attachment parts 115 and 186 may have a rectangular shape having a width larger than the width of the bonding film 190 such that the bonding film 190 can be easily bonded to the first and second bonding film attachment parts 115 and 186.

Thus, after the display panel 120 and the backlight assembly BA have been is received in the bottom cover 180, the top cover 110 may be coupled to the bottom cover 180 and the bonding films 190 may be attached to the first and second bonding film attachment parts 115 and 186, thereby fixing the top cover 110 and the bottom cover 180.

In addition, since the bonding film 190 may be bonded through the first and second bonding film attachment parts 115 and 186, the bonding film 190 may not protrude beyond the surface of the top cover 110 and the bottom cover 180, so that the bonding film 190 can be prevented from being detached from the display apparatus 100 during a manufacturing process or transferring process of the display apparatus 100.

The top cover 110 may further include a plurality of third bonding film attachment parts 116, which are recessed at the top surface 112 of the top cover 115 and connected to the first bonding film attachment parts 115.

The bonding film 190 may extend to the third bonding film attachment parts 116, so that the top cover 110 can be more securely coupled with the bottom cover 180.

As can be appreciated from the exemplary embodiments of the invention described herein, the display apparatus 100 may not use screws, and may, instead, employ the bonding film 190 to couple the top cover 110 to the bottom cover 180. Thus, the display apparatus 100 according to exemplary embodiments of the present invention may have a slim structure.

In addition, since the display apparatus 100 may not use screws, a defect occurring in an assembly process for the display apparatus 100, such as the wear of the screw thread, can be prevented.

Further, the bonding film 190 has a superior adhesive force and can be easily removed from the top cover 110 or bottom cover 180. The bonding film 190 does not require the is additional adhesive, and, therefore, the bonding force of the bonding film 190 may rarely vary after the bonding film 190 has been removed from the top cover 110 and the bottom cover 180. Accordingly, the bonding film 190 can be reused.

In addition, since the bonding film 190 includes an elastic polymer, the display apparatus 100 can absorb or attenuate an external impact. Accordingly, a resistance of the display apparatus 100 against an external impact is herein improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
a display panel comprising a display area to display an image;
a bottom cover comprising a bottom surface having a shape corresponding to a shape of the display panel and lateral sides extending upward from the bottom surface, the display panel being positioned within the bottom cover;
a top cover comprising a top surface having a display window to expose the display area and lateral sides extending toward the bottom cover from the top surface, the top cover to support edges of the display panel; and
a bonding film bonded to the top cover and the bottom cover to fixedly couple the top cover to the bottom cover, the bonding film comprising a base having a plate shape, a plurality of first protrusions protruding from a surface of the base facing the top cover and the bottom cover, a plurality of second protrusions protruding from surfaces of the first protrusions facing the top cover and the bottom cover, and a plurality of bonding parts disposed on the second protrusions,
wherein an area of a surface of each bonding part bonded to the top cover and the bottom cover is larger than a sectional area of each second protrusion parallel to the surface of each bonding part,
wherein the bonding film is bonded along a border of the top cover and the bottom cover, and
wherein the surface of the each bonding part bonded to the top cover and the bottom cover contacts the top surface of the top cover and the bottom surface of the bottom cover.

2. The display apparatus of claim 1, wherein the top cover comprises a plurality of first bonding film attachment parts recessed at the lateral sides of the top cover and the bottom cover comprises a plurality of second bonding film attachment parts recessed at the bottom surface of the bottom cover corresponding to the first bonding film attachment parts.

3. The display apparatus of claim 2, wherein the top cover further comprises a plurality of third bonding film attachment parts recessed at the top surface of the top cover and connected to the first bonding film attachment parts.

4. The display apparatus of claim 3, wherein the bonding film is bonded to at least the first bonding film attachment part and the second bonding film attachment part.

5. The display apparatus of claim 1, wherein the bonding film comprises a polymer.

6. The display apparatus of claim 5, wherein the polymer comprises at least one material selected from the group consisting of poly tetra fluoro ethylene, polydimethylsiloxane, polyethylene glycol, polyurethane, or β-keratin.

7. The display apparatus of claim 1, wherein the base comprises a groove corresponding to edges of the top cover and the bottom cover, and the groove is recessed at a top surface of the base facing the top cover and the bottom cover and extends from one end to an opposite end of the base.

8. The display apparatus of claim 1, wherein the base comprises a groove corresponding to edges of the top cover and the bottom cover, and the groove is recessed at a bottom surface of the base opposite to the top cover and the bottom cover and extends from one end to an opposite end of the base.

9. A bonding film, comprising:
a base having a plate shape;
a plurality of first protrusions to protrude from a surface of the base to face an object to be bonded;
a plurality of second protrusions to protrude from surfaces of the first protrusions to face the object to be bonded; and
a plurality of bonding parts disposed on the second protrusions, wherein an area of a surface of each bonding part to be bonded to the object is larger than a sectional area of each second protrusion parallel to the surface of each bonding part,
wherein the surface of each bonding part to be bonded to the object is configured to contact a surface of the object, and
wherein the bonding film comprises at least one material selected from the group consisting of poly tetra fluoro ethylene, polydimethylsiloxane, polyethylene glycol, and β-keratin.

10. The bonding film of claim 9, wherein the base comprises a groove recessed at a top surface of the base facing the object to be bonded, the groove extending from one end to an opposite end of the base.

11. The bonding film of claim 9, wherein the base comprises a groove corresponding to edges of the object to be bonded, and the groove is recessed at a bottom surface of the base opposite to the object to be bonded.

12. A method of manufacturing a bonding film, the method comprising:
preparing a mold comprising a base film and a top film formed on the base film, wherein a plurality of holes expose at least one portion of the base film;
coating a polymer on the mold whereby the polymer fills the holes; and
forming a groove in the polymer coated on the mold, wherein the groove extends from one end to an opposite end of the polymer.

13. The method of claim 12, wherein a boundary surface exposed through the holes is parallel to or inclined to a surface of the mold.

14. The method of claim 12, wherein an area of a surface exposed at a boundary surface between the base film and each hole is larger than a sectional area of each hole.

15. The method of claim 13, wherein the top film comprises a plurality of recesses formed opposite to the boundary surface while surrounding the holes in one-to-one correspondence.

16. The method of claim 12, wherein the base film is provided at a boundary surface of the mold with a protrusion having a height higher than a thickness of the top film.

17. The method of claim 16, wherein the protrusion extends from one end to an opposite end of the base film.

* * * * *